March 10, 1959  R. HOCHSCHILD  2,877,406
NON-DESTRUCTIVE METHOD AND MEANS FOR FLAW DETECTION
Filed June 10, 1954

INVENTOR
RICHARD HOCHSCHILD
BY
ATTORNEY

United States Patent Office 2,877,406
Patented Mar. 10, 1959

2,877,406

NON-DESTRUCTIVE METHOD AND MEANS FOR FLAW DETECTION

Richard Hochschild, Richland, Wash., assignor to the United States of America as represented by the United States Atomic Energy Commission Application June 10, 1954, Serial No. 435,957

5 Claims. (Cl. 324—40)

The present invention relates to a new and improved method and apparatus for the non-destructive detection of flaws in electrically conductive articles such as for example, manufactured metal parts.

In many of the modern industries equipped for mass production there are growing needs for improved methods whereby faulty products may be efficiently detected to the end that they may be eliminated or that corrective measures can be quickly applied. In particular, the non-destructive flaw detection techniques are to be desired and various of these techniques, such as the optical, radiological, acoustic, magnetic and electrical methods have been proposed and have been employed with varying degrees of success.

Metal fabricators, for example, require that their stock materials supplied in sheets, rods, tubes and the like contain no internal fissures or cracks which would cause the final product to fail during preliminary machining or in use after fabrication. As a further example, food processing establishments often use similar techniques to detect metal or other foreign matter in their products. Similar examples of potential usages of the present invention will be apparent to those skilled in the art.

Generally the test as to quality of the material is conducted upon representative test specimens of a large amount of the material in accordance with recognized quality control procedures. A manufacturer of metal products therefore has the choice of employing one of the above mentioned non-destructive testing techniques or of using the conventional destructive test which usually requires sawing a section of a specimen for microscopic examination or for running tensile or compressive tests to failure of the specimen.

The present invention relates to eddy current non-destructive testing for hidden flaws and represents an improvement on present methods of this type. It is equally applicable to the testing of a fabricated completed article or to the testing of a specimen of such article. One known method includes establishing an alternating magnetic field in the article under test by means of an external source. This magnetic field produces an eddy current flow in the electrically conductive article. If a flaw is present in the article, the eddy current flow will be disturbed and flow about the flaw. This change in distribution of the eddy current flow is then detected externally.

For a cylindrical article or test specimen, for example, this known method of eddy current flaw detection uses a circumferentially wound coil in the form of a solenoid. Energization of the solenoid produces a magnetic field in a direction generally parallel to the axis of the specimen. A secondary coil is circumferentially wound interiorly of the solenoid. This secondary coil is sensitive to the eddy current flow in the specimen. Therefore, a change in this eddy current flow arrangement will cause a change in the output current picked up in the secondary coil.

The difficulty with the above-described arrangement is that its sensitivity is limited. That is, the lines of flux set up by the primary coil, thread the secondary coil at all times. Therefore, there is always some minimum output current induced in the secondary coil. A change in this minimum output current must be appreciable enough to be detected.

On the other hand, the present invention is an improvement of this method and apparatus and has a much higher sensitivity. This higher sensitivity results from the fact that in the proposed scheme, no output current is induced in the secondary coil until a flaw is present in the test part. When an article containing a flaw is tested, the distorted eddy current flow about this flaw induces a measurable output current.

More particularly, the present invention includes a non-destructive method of detecting flaws in an electrically conductive article which comprises establishing an alternating homogeneous magnetic field in the article under test, aligning a probe element adjacent the article until there is no component of the magnetic field in the direction of the probe axis so that zero output current is induced in the probe due to the established magnetic field, and scanning the entire surface of said article with said probe element, whereupon any output current obtained in said probe element will be an indication of a field inhomogeneity and accordingly of the size and location of a flaw in the article under test.

Figure 1:
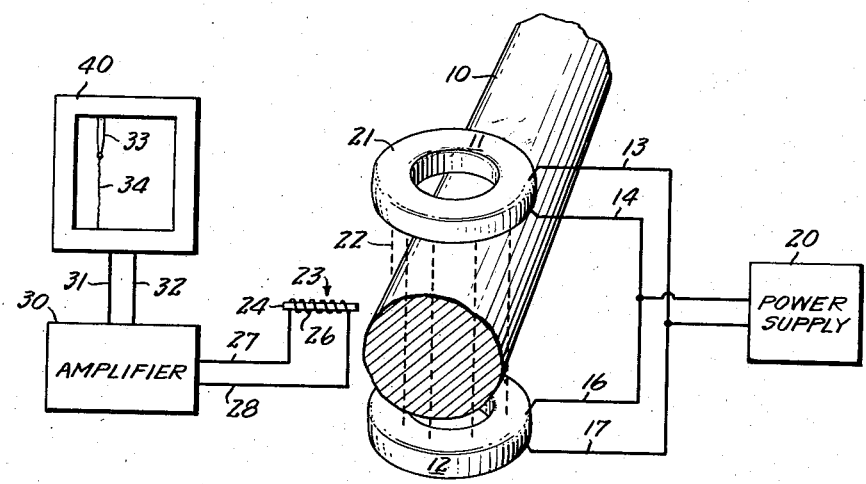
Figure 1 is a perspective view of one embodiment of the present invention, showing the apparatus in operative relation to the article under test including conventional electronic measuring apparatus in diagrammatic relationship.

Referring now to Figure 1, a cylindrical test article 10 is shown positioned between two narrow, circularly wound coils 11 and 12. Attached to coil 11 are conductors 13 and 14 and attached to coil 12 are conductors 16 and 17. Conductors 13, 14, 16 and 17 are connected to a power supply 20. This power supply is conveniently shown in block diagram since any one of many conventional electronic alternating current power supplies may be used.

The wire for coils 11 and 12 and for the probe element 23 may be of the conventional enamel insulated type. The finished coils are then wound with an insulating tape 21. Upon the energization of coils 11 and 12, by means of power supply 20, an alternating homogeneous magnetic flux is established between the coils. The lines of flux of this magnetic field are illustrated by the dotted lines 22. In the embodiment shown in Figure 1, coils 11 and 12 are positioned so that the lines of flux 22 are perpendicular to the axis of the article 10.

Adjacent the surface of the test article is a probe element, indicated generally by the arrow 23. Probe element 23 consists either of a non-conducting core or of a very thin magnetic core 24 about which is wound a coil 26. Attached to coil 26 are conductors 27 and 28 which in turn are connected to an amplifier 30.

The amplifier 30 may be of a conventional type capable of amplifying alternating current impulses. Various designs for accomplishing this purpose are well known to those skilled in the art.

The output of the amplifier 30 may be connected on conductors 31 and 32 to a recording unit 40. The recorder 40 may be a conventional type having a pen 33 which records in ink on a paper roll as indicated by the trace 34, the pen being mounted so as to deflect an amount proportional to the applied impulse coming from the amplifier 30.

In operation, the coils 11 and 12 are energized and positioned so that the homogeneous magnetic field is established in that portion of the article under test. It is apparent that the size and the orientation of coils 11 and 12 are not limited with respect to the article so that the homogeneous magnetic field may actually be established throughout the entire article under test and also in any direction. The probe element 23 is then positioned adjacent the surface of article 10. The axial direction of the probe 23 is varied until a zero output is indicated on recorder 40. If the article and the magnetic field are completely homogeneous, the position of zero output current will be where the core 24 is perpendicular to the lines of flux 22. For ease in testing and scanning the surface of test article 10, the core 24 may be positioned perpendicular to the axis of the cylindrical article.

In order to check the test article for flaws, the probe unit scans the entire surface of the article. This can be accomplished by relative movement between the probe unit, the article under test and the magnetic field producing coils. That is, the article can be rotated and translated past the probe unit or the probe unit can move along the length of the article while the article is being rotated. This latter method can be easily accomplished by the use of a standard metal or wood turning lathe. The article can be mounted in the chuck of the rotating work position and the probe element can be mounted on the tool holder.

Many combinations of relative motion between the article under test and the probe unit will be readily apparent to those skilled in the art. Therefore, if the article under test is flaw-free, no output impulses of current are induced in the winding 26 during the probe scanning operation. This results from the fact that there are no components of the magnetic field established by coils 11 and 12 which are parallel to the core 24.

After the probe element has scanned the entire surface of the test article the permanent record on the recorder 40 indicates whether or not any flaws are in the article. These flaws may consist of voids, cracks, fissures, etc., or elements of foreign matter. If the trace 34 on the recorder 40 is smooth and continuous as indicated in Figure 1, it will be apparent that no flaws are present. On the other hand, if any flaws are contained by the article, these will generally be shown on the recorder as will be described hereinbelow.

Figure 2:
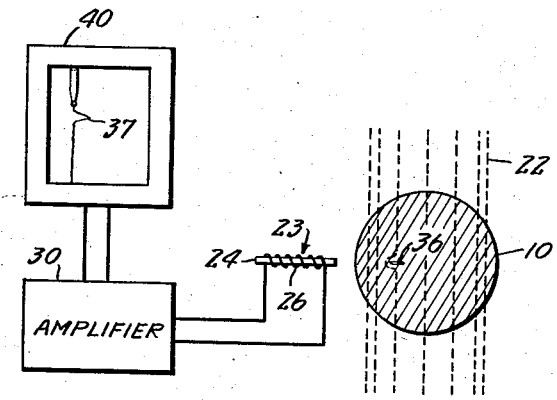
Figure 2 is a diagrammatic representation of an apparatus embodying the present invention showing the response of the apparatus to the presence of a flaw in the article under test.

Referring now to Figure 2, the test article 10 is shown positioned as in Figure 1 with its axis perpendicular to the lines of flux 22. In this case, however, the article 10 includes some flaw indicated by the line 36. The flaw 36 may be located either at the surface of the article or anywhere in the interior thereof.

It is seen that the flux line now bends about the flaw 36, thereby providing a component of the magnetic field parallel to the core 24 of the probe element 23. This parallel component of the field induces a current impulse in the winding 26, which impulse is amplified by the amplifier 30 and recorded on the recorder 40. This is indicated by the peak 37 on the trace 34 as the article is scanned. It is apparent that the amplitude of the peak 37 will be proportional to the amplitude of the parallel component of the magnetic field. Therefore, the larger the flaw, the more the flux lines will be bent and the larger the peak 37. The location of the flaw is simply determined from the peak on the recorder, since the recording paper turns at a constant rate which can be made proportional to the scanning rate of the article.

In the illustration described in Figure 2, the flux lines 22 are shown being distorted by the flaw. It can be shown that this effective distortion occurs as follows: The established homogeneous magnetic field induces eddy current flow in the electrically conducting article 10. This eddy current flow in turn induces a secondary magnetic field which is in a direction opposite to the primary applied magnetic field. In a homogeneous article, the eddy current flow is homogeneous and the induced secondary magnetic field is homogeneous. But when a flaw is present in the test article, such as a crack, fissure or some foreign matter, the eddy currents will not flow across the flaw but will be forced around it. This distorts the induced secondary magnetic field, thereby distorting the applied homogeneous magnetic field as indicated in Figure 2.

It should be noted that the sensitivity of the method for flaws located at different depths varies with the frequency of the applied magnetic field. Therefore, if a relatively thick article is being tested, a lower frequency is used. On the other hand, if only the area near the surface is to be inspected or a thin article is under test, a higher frequency is used.

The present invention is also particularly applicable to the testing of Bundy tubing. This tubing has a cross section in the form of a spiral several layers thick. Defects such as voids between layers are likely to be in the longitudinal direction, i. e., parallel to the axis of the tubing. Instruments using circumferential coils are insensitive to this type of defect but it is apparent from the foregoing description that apparatus incorporating the method of the present invention can easily detect such defects.

While the salient features of this invention have been described in detail with respect to only one embodiment, it will of course be apparent that numerous modifications may be made within the spirit and scope of this invention and it is therefore not desired to limit the invention to the exact details shown except insofar as they may be defined in the following claims.

I claim:

1. The non-destructive method of detecting flaws in an electrically conductive article which comprises establishing an alternating homogeneous magnetic field in the article under test in a region where flaws are to be detected, said field being transverse to said article, aligning a probe element adjacent to said region of said article through which the homogeneous magnetic field passes until zero output current is induced in said element due to the established magnetic field, rotating and translating said article so that the probe element scans the surface of said region, maintaining the alignment of said probe element to said magnetic field during the scanning and maintaining the axis of said probe element transverse to the direction of translation of said article, any output current obtained in said probe element being an indication of the size and location of a flaw in said article under test.

2. The non-destructive method of detecting flaws in an electrically conductive article which comprises establishing an alternating homogeneous magnetic field in the article under test, said field being transverse to said article, aligning a probe element with its axis perpendicular to the lines of flux of said magnetic field, rotating and translating said test article so that said probe element scans the surface thereof and maintaining the axis of said probe element transverse to the direction of translation of said test article, any output current obtained in said probe element being a measure of the size and location of a flaw in said article under test.

3. The non-destructive method of detecting flaws in an electrically conductive cylindrical article which comprises establishing an alternating homogeneous magnetic field in said article, the lines of flux of said field being perpendicular to the axis of said cylindrical article, aligning a probe element adjacent to said article until the axis of said probe element is perpendicular to both the axis of said article and said lines of flux, and rotating and translating said test article so that said probe element scans the entire surface thereof, any output current obtained in said probe element being a measure of the size and location of a flaw in said article under test.

4. Apparatus for the non-destructive detection of flaws in an electrically conductive test article, which comprises, in combination, a pair of coils arranged one on each side of said test article so disposed with reference thereto that when electrically energized they produce an alternating homogeneous magnetic field in said article, power supply means for energizing said coils, said magnetic field being transverse to said article, a probe element positioned adjacent said article and with its axis perpendicular to the lines of flux of said magnetic field and transverse to said article whereby any flaw in said test article in close proximity to said probe element induces a current in said element having a magnitude proportional to the size of said flaw.

5. The non-destructive method of detecting flaws in an electrically conductive article which comprises establishing an alternating homogeneous magnetic field in the article under test in a region where flaws are to be detected, said field being transverse to said article, aligning a probe element adjacent to said region of said article through which the homogeneous magnetic field passes until zero output current is induced in said element due to the established magnetic field, scanning the surface of said region with said probe element and maintaining the axis of said probe element transverse to the direction of relative movement between it and said test article, the axis of said probe element intersecting the surface of said region, said probe element viewing an area of the surface of said region, maintaining the alignment of said probe element to said magnetic field during the scanning, any output current obtained in said probe element being an indication of the size and location of a flaw in said article under test.

References Cited in the file of this patent

UNITED STATES PATENTS

| | | |
|---|---|---|
| Re. 15,859 | Burrows | June 17, 1924 |
| 2,065,118 | Davis | Dec. 22, 1936 |
| 2,511,233 | Anderson | June 13, 1950 |
| 2,519,367 | Gunn | Aug. 22, 1950 |

OTHER REFERENCES

Electronics, September 1949, pages 100–103; article by Schafer.